UNITED STATES PATENT OFFICE.

ERWIN EMIL ALBERT GEORG MEYER, OF NEW BRUNSWICK, NEW JERSEY.

PROCESS OF RECOVERING RUBBER WASTE.

986,931.     Specification of Letters Patent.     Patented Mar. 14, 1911.

No Drawing.     Application filed April 29, 1908. Serial No. 429,809.

*To all whom it may concern:*

Be it known that I, ERWIN EMIL ALBERT GEORG MEYER, a subject of the German Emperor, residing at New Brunswick, State of New Jersey, have invented certain new and useful Improvements in Processes of Recovering Rubber Waste, of which the following is a specification.

The present invention relates to the process for recovering rubber waste, and has for its object to provide a process which shall act more quickly and thoroughly than the processes heretofore in use and at the same time shall result in economy of operation.

Heretofore the processes commonly used have consisted generally in subjecting the finely divided rubber waste to the action of an alkaline solution in a closed vessel at comparatively high temperatures and pressures. This process, however, is a long and tedious one and relatively costly.

By the process of this invention I am enabled to materially save in the period of time required and the resulting product is more thoroughly freed of the ingredients added during vulcanization than by any process with which I am familiar.

The gist of my invention lies in the discovery that the oil known in the trade as "Chinese wood oil", when heated, has a practically instantaneous dissolving action upon vulcanized rubber. In the practice of my process, therefore, I take rubber waste which has been ground up and add to this rubber waste heated Chinese wood oil sufficient to thoroughly cover and permeate the mass. The action of the oil is hastened and made more thorough by stirring the rubber waste in the oil. The action of the oil is to practically instantaneously dissolve all the rubber. In practice, after the dissolving action of the oil is complete, I dilute it with any well known rubber solvent to make the subsequent action of filtration and precipitation more easy. For the purpose of dilution it is preferable to employ a solvent having a comparatively high boiling point which will permit of its being mixed with the heated oil without evaporation of the solvent. The next step in the process is to draw off the fluids carrying the rubber in solution, precaution being taken that all the rubber capable of being dissolved is extracted from the fiber with which it is usually associated in vulcanized articles. To do this I may subject the fiber to a second action of fresh wood oil. I then add to the fluids drawn off from the rubber waste and which carry the rubber in solution, any well known agent for precipitating the rubber, acetone acting for this purpose in a satisfactory manner. After the rubber is all precipitated I allow it to settle and draw off the fluid for re-use after separation. The solid rubber precipitated is of a very good quality carrying a minimum of foreign ingredients. The rubber particles are pressed, dried and sheeted in any convenient manner, as by processes well known in the art.

What I claim as new is:

1. The process of dissolving vulcanized rubber by subjecting it to the action of heated Chinese wood oil and subsequently precipitating the rubber held in solution.

2. The process of dissolving vulcanized rubber, which consists in subjecting it to the action of heated Chinese wood oil, subsequently diluting it with a rubber solvent, and finally precipitating the rubber in solution.

3. The process of recovering waste rubber which comprises, subjecting said rubber to the action of heated Chinese oil and subsequently separating said rubber from said oil.

4. The process of recovering waste rubber which comprises dissolving said rubber in heated Chinese oil and subsequently treating the solution with an agent for precipitating the rubber.

5. The process of recovering waste rubber which comprises dissolving said rubber in heated Chinese wood oil, diluting the solution with a suitable solvent and then separating the rubber from said solution and solvent.

6. The process of recovering waste rubber which comprises dissolving said rubber in heated Chinese wood oil, adding a suitable solvent to the solution and then in precipitating the rubber from said solvent and solution.

In witness whereof, I have signed my name in the presence of two witnesses.

ERWIN EMIL ALBERT GEORG MEYER.

Witnesses:
H. RICHARD WOBSE,
M. M. LULLNAN.